June 19, 1962  A. M. MOOS  3,040,115
FUEL CELL ELECTRODES
Filed Sept. 28, 1960
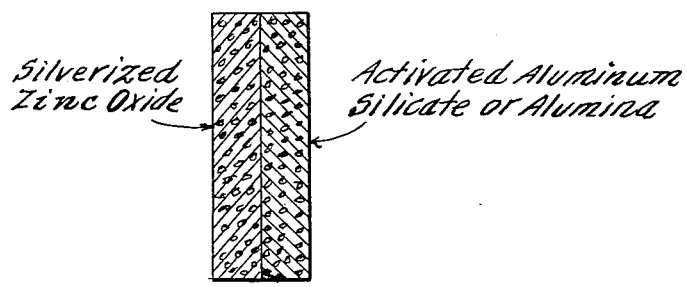
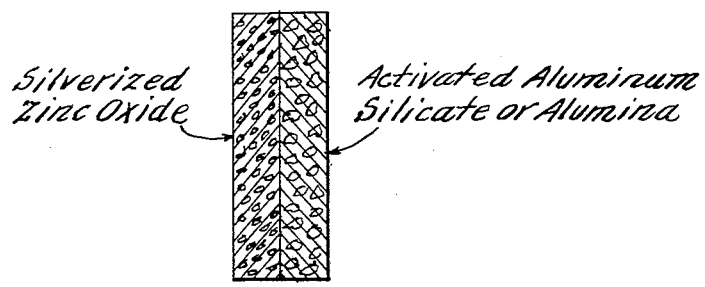
INVENTOR
Anthony M. Moos
BY Watson, Cole, Grindle & Watson
ATTORNEYS

United States Patent Office 3,040,115
Patented June 19, 1962

3,040,115
FUEL CELL ELECTRODES
Anthony M. Moos, Ossining, N.Y., assignor to Leesona Corporation, Cranston, R.I., a corporation of Massachusetts
Filed Sept. 28, 1960, Ser. No. 58,888
7 Claims. (Cl. 136—120)

This invention relates to improved fuel cells and more partciularly to novel fuel cell electrodes which are particularly well suited for high temperature operations.

A fuel cell, as the term is employed in this specification, is an electrochemical cell in which the free energy of combustion of the fuel is converted directly into electrical energy. A simple cell comprises a housing, a fuel electrode, an oxidizing electrode, and an external means for drawing off electrical current. An oxidizing gas such as oxygen is passed through, or on one side of the oxidizing electrode and a fuel gas is passed through, or on one side of the fuel gas electrode. The oxidizing gas is adsorbed in the pores of the oxygen electrode and de-adsorbed therefrom migrating as $O^{--}$ ions into the electrolyte leaving behind two positive charges. The fuel gas is similarly adsorbed and de-adsorbed from the pores of the fuel electrode migrating into the electrolyte as $H^+$ ions, in the case of hydrogen fuel, leaving behind a negative charge. The positive and negative ions unit to form a neutral molecule in the solution while the charges on the electrodes are utilized as electrical energy. In the case of the $O^{--}$ and $H^+$ ions, the neutral molecule is water.

The earliest fuel cells date back to at least as early as the 19th century when Davy and Grove made several attempts to carry out the electrochemical oxidation of fuels. Only recently work on fuel cells received renewed impetus, spurred by such developments as the superior hydrogen-oxygen fuel cell of Francis T. Bacon which made it apparent that the ultimate efficiency of fuel cells can far surpass the efficiency of heat engines which are limited to about 38% output by the carnot cycle. However, even with the modern developments in fuel cell technology which has made the cells commercially attractive, the fuel cell is still capable of substantial improvement in its efficiency and therefore, is the object of concentrated research.

The basic problem in making an efficient fuel cell is essentially one of chemical kinetics, the object being to carry out the reaction of a fuel gas and an oxidizing gas in such a manner that the proportion of free energy degraded into heat is as small as possible. At the same time, reaction rates must be high enough so that sufficient output from practical sized cells can be economically attained. One particular aim of modern research is the development of an efficient electrochemically stable electrode which is not detrimentally attacked, even at high temperatures, by the electrolyte of the cell.

Therefore, it is an object of the instant invention to provide an improved electrode which is electrochemically stable when employed in a fuel cell operated at high temperatures.

It is another object of the invention to provide an electrode which is economical to produce containing a highly active surface.

It is still another object of the invention to provide a fuel cell which is electrochemically stable.

It is still another object of the invention to provide a method of making an improved electrode. These and other objects of the invention are seen from the following detailed description with particular reference to the specific illustrative examples.

According to the instant invention, a fuel cell is constructed for high temperature operations wherein at least one electrode is composed of a mixture of zinc oxide and metallic silver and where the gas interface of the electrode is coated with an aluminum silicate or alumina activated with an activating metal such as palladium, platinum, rhodium or gold. The electrode in one preferred embodiment comprises a porous cermet consisting of two layers in intimate contact with each other, the layer fronting the electrolyte consisting of zinc oxide bonded with metallic silver and the layer fronting the fuel consisting of alumina or aluminum silicate impregnated with an activating metal. The instant electrodes have a high degree of ionic conductivity, are not subject to irreversible chemical changes and allow the full theoretical E.M.F. of the cell to be rapidly developed. The drawing more clearly illustrates the invention with FIGURE 1 being directed to an electrode having two dissimilar surfaces, one of the surfaces being composed of a silverized zinc oxide and the second being composed of a member of the group consisting of metal activated aluminum silicate and activated alumina. The pores of both surfaces are of substantially the same diameter. FIGURE 2 demonstrates a similar electrode wherein the two surfaces have pores of a different diameter, forming a bi-porous electrode.

The electrodes described herein can be operated in fuel cells utilizing solid electrolytes or fused electrolytes. An example of a solid electrolyte is an eutectic mixture of sodium and lithium carbonates held in a porous sintered magnesia disc. Similarly, an eutectic mixture of sodium and lithium carbonates can be used in the molten stage with the electrodes attached to metal backing plates and the molten electrolyte occupying the space between the electrodes. The flow of the electrolyte into the porous electrodes and the corresponding flooding and deactivation of the electrodes is prevented by suitable regulation of gas pressures so that the gases do not bubble through the electrodes, but is still sufficient to overcome the capillary action of the electrolyte in order that the three phase interface of solid, liquid and gas occurs substantially at the point where the two layers are in contact. Any suitable solid or fused electrolyte can be used in a fuel cell utilizing the electrodes of the instant invention.

The usual range of operating temperatures of the instant cells is in the range of from about 500–700° C. The temperature to a large extent depends upon the fuel used. Fuels such as hydrogen, carbon monoxide, methanol, methane, propane and kerosene vapors have been found to be particularly advantageous fuels, however, other carbonaceous fuels can be employed. With carbonaceous fuels there is always a potential danger of deposition of solid carbon in the cell causing blocking of the gas passages and loss of energy due to irreversible electrochemical side reactions. This problem has been solved to a large extent by the use of the instant electrodes. Apparently, the carbon formation is not catalyzed by the metals of the electrode. The minor traces of carbon formation which may occur can be prevented by adding water vapor or carbon dioxide to the fuel gas.

The zinc oxide and metallic silver plates, forming one part of the electrode of the invention can be formed by known methods with the mixture of zinc oxide and metallic silver containing at least 1% of silver and preferably a higher percentage in order to obtain good conductivity. The proportion of silver can range up to as high as 50%, the limiting feature being the economical consideration. The silver-zinc oxide mixture can be made by impregnating finely graded zinc oxide with a silver nitrate or silver acetate solution, drying and igniting at temperatures sufficient to reduce the silver nitrate or silver acetate to metallic silver. It may be desirable to carry out the reduction in an atmosphere of forming gas (10% hydrogen and 90% nitrogen). The zinc oxide-metallic silver layer of the electrolyte can be made by other known methods.

A porous cermet electrode can be made by processes commonly employed in powder metallurgy. For example, a powdered mixture of zinc oxide prepared as described above is mixed with a spacing agent such as sodium bicarbonate and sintered at about 900° C. As another method, the required porosity of the electrode can be obtained by self-spacing, i.e., by sintering carefully graded or fractionated silvered zinc oxide particles. The mechanical strength of the structure can be improved by adding silver powder to the mix before sintering.

The layer of the electrode facing the fuel gas side can be made by pressing and sintering a mixture of carbon and impregnated alumina or aluminum silicate and thereafter activating the plate with a catalytic metal. Alternatively, the layer can be composed of alumina or aluminum silicate impregnated with an activating metal. The impregnation of the alumina or aluminum silicate can be accomplished by known methods as for example, by preparing a salt solution of a reducible activating metal and immersing the porous silicate structure in the solution. The amount of activating metal plated upon the porous structure will depend to a large extent upon the concentration of the solution employed as well as upon the length of time of the immersion and temperature of the bath. Typical catalytic metals which can be used to activate the structure are platinum, palladium, rhodium, gold, neodymium, nickel, cobalt, ruthenium, cadmium, molybdenum and copper. The proper choice depends to a substantial extent upon the choice of carbonaceous fuel used in the cell operation.

A typical embodiment of a fuel cell using the electrodes of the instant invention is as follows:

*Example I*

A zinc oxide powder was admixed with a saturated aqueous solution of silver acetate to form a thick paste. The ratio of zinc oxide to silver was about 65–35. After drying, the mixture was pulverized so that at least 90% of the particles would pass through a 45 mesh screen. The pulverized mixture was mixed with 20% by weight of a precipitated silver powder and molded at a pressure of 0.5 p.s.i. into a rectangular plate 6 mm. thick. The pressed plate was heated slowly to 400° C. in an atmosphere of forming gas (10% hydrogen and 90% nitrogen) and maintained at this temperature for 35 minutes. The temperature was then raised to 900° C. and held at that temperature for one hour. The plate had an average pore size of approximately 190 microns.

A porous aluminum silicate rectangular plate 5 mm. thick was immersed in a 2% aqueous solution of palladium nitrate at a temperature of 65° C. and maintained for a period of 1½ hours. The impregnated silicate structure was removed from the bath and placed in an oven at 200° C. through which a current of hydrogen gas was passed to produce a palladium activated coating upon the silicate substrate. The finished structure had an average pore size of 75–80 microns.

A fuel cell was constructed in a suitable metal housing with a zinc oxide/metallic silver oxidizing electrode and a fuel electrode consisting of two layers in intimate contact with each other. The layer facing the electrolyte was the zinc oxide/metallic silver plate described above, and the layer in contact with the fuel consisted of the impregnated aluminum silicate plate, described above. The electrodes were separated with a free molten electrolytic eutectic mixture of sodium and lithium carbonates. Air was passed on one side of the oxidizing electrode and kerosene vapors were passed on one side of the fuel electrode. The cell was operated at a temperature of 650° C. The cell under these conditions was catalytically active and demonstrated a high degree of electrochemical stability. The cell was neither oxidized nor reduced.

*Example II*

A similar cell was constructed using a solid eutectic mixture of sodium and lithium carbonates as the electrolyte held in a porous sintered magnesia disc. The cell functioned in substantially the same manner as the cell using a molten electrolyte.

It should be appreciated that the invention is not to be construed as being limited by the illustrative examples. It is still possible to produce other embodiments without departing from the inventive concept herein disclosed. Such embodiments are within the ability of one skilled in the art.

What is claimed is:

1. An electrode for a fuel cell having two dissimilar surfaces, one of said surfaces being composed of a silverized zinc oxide and the second of said surfaces being composed of a member of the group consisting of a metal activated aluminum silicate and a metal activated alumina.

2. The electrode of claim 1 wherein the two dissimilar surfaces are bonded together by sintering.

3. The electrode of claim 1 wherein one of the dissimilar surfaces has a different pore size from the other surface.

4. The electrode of claim 1 wherein the activating metal is a member of the group consisting of platinum, palladium, rhodium, gold, neodymium, nickel, cobalt, ruthenium, cadmium, molybdenum and copper.

5. In a fuel cell comprising a housing, an electrolyte, and at least two electrodes the improvement wherein at least one of said electrodes has two dissimilar surfaces, one of said surfaces being composed of silverized zinc oxide and the second of said surfaces being composed of a member of the group consisting of metal activated aluminum silicate and metal activated alumina.

6. The fuel cell of claim 4 wherein at least one electrode is a porous cermet consisting of two layers in intimate contact with each other, with one of said layers being in contact with the electrolyte and the second layer in contact with the fuel, said layer in contact with the electrolyte consisting of zinc oxide bonded with metallic silver and said layer in contact with the fuel consisting of alumina activated with a metal catalyst.

7. The fuel cell of claim 5 wherein the activating metal is a member of the group consisting of platinum, palladium, rhodium, gold, neodymium, nickel, cobalt, ruthenium, cadmium, molybdenum and copper.

References Cited in the file of this patent

UNITED STATES PATENTS

| 2,914,596 | Gorin et al. | Nov. 24, 1959 |

FOREIGN PATENTS

| 806,591 | Great Britain | Dec. 31, 1958 |